US011246035B2

(12) United States Patent
Hwang et al.

(10) Patent No.: US 11,246,035 B2
(45) Date of Patent: Feb. 8, 2022

(54) PROGRAMMABLE LONG-RANGE WIRELESS SIGNAL REMOTE CONTROL DEVICE

(71) Applicant: SUPERIOR ELECTRONICS CORPORATION, Taipei (TW)

(72) Inventors: Shih-Ming Hwang, Irvine, CA (US); James Chien-Jong Hwang, Irvine, CA (US); Lawrence Liang-Lun Hwang, Irvine, CA (US)

(73) Assignee: SUPERIOR ELECTRONICS CORPORATION, Taipei (TW)

( * ) Notice: Subject to any disclaimer, the term of this patent is extended or adjusted under 35 U.S.C. 154(b) by 149 days.

(21) Appl. No.: 16/563,044

(22) Filed: Sep. 6, 2019

(65) Prior Publication Data
US 2020/0329377 A1 Oct. 15, 2020

(30) Foreign Application Priority Data

Apr. 15, 2019 (TW) .................................. 108204566

(51) Int. Cl.
*H04W 12/106* (2021.01)
*H04L 29/08* (2006.01)
*H04W 4/38* (2018.01)

(52) U.S. Cl.
CPC ......... *H04W 12/106* (2021.01); *H04L 67/025* (2013.01); *H04L 67/12* (2013.01); *H04W 4/38* (2018.02)

(58) Field of Classification Search
CPC .... H04W 12/106; H04W 4/38; H04L 67/025; H04L 67/12
See application file for complete search history.

(56) References Cited

U.S. PATENT DOCUMENTS

| 8,781,442 B1 * | 7/2014 | Link, II | H04L 9/3297 455/411 |
| 9,686,054 B2 * | 6/2017 | Yang | H04L 5/0005 |
| 9,967,149 B1 * | 5/2018 | Fiennes | H04W 76/10 |
| 2011/0066297 A1 * | 3/2011 | Saberi | F16K 31/046 700/287 |
| 2013/0077641 A1 * | 3/2013 | Burger, Jr. | H04L 9/3297 370/474 |
| 2015/0204561 A1 * | 7/2015 | Sadwick | F24F 11/30 236/1 C |

(Continued)

*Primary Examiner* — Blake J Rubin
(74) *Attorney, Agent, or Firm* — WPAT, PC

(57) ABSTRACT

The present invention provides a programmable long-range wireless signal remote control device that receives a wireless signal through a processor, performs a verification procedure on the wireless signal by using a signal packet data protocol entity, and then utilizes a control transmission interface to transmit the control signal in the wireless signal to a processing component. A sequence data control interface transmits a data signal in the wireless signal externally, and a programmable entity controls a number of sequences and the time of transmitting the wireless signal or a control signal externally, thereby achieving the effect of information preservation and data identification, the reception and transmission of stable signals, transmission of the control signal in a one-to-many time-series interval manner, and the provision of the control signal and the data signal to a controlled device.

18 Claims, 8 Drawing Sheets

(56) References Cited

U.S. PATENT DOCUMENTS

| | | | |
|---|---|---|---|
| 2015/0271037 A1* | 9/2015 | Wiley | H04B 3/46 |
| | | | 370/252 |
| 2017/0318322 A1* | 11/2017 | Lamb | H04N 21/478 |
| 2018/0003572 A1* | 1/2018 | Garsd | G01K 3/14 |
| 2018/0126950 A1* | 5/2018 | Alderman | H04W 4/40 |
| 2018/0227221 A1* | 8/2018 | Starsinic | H04L 45/566 |
| 2019/0006885 A1* | 1/2019 | Danilovic | H02H 3/38 |
| 2019/0044658 A1* | 2/2019 | Lomayev | H04W 72/0453 |
| 2019/0149365 A1* | 5/2019 | Chatterjee | H04L 5/0092 |
| | | | 370/329 |
| 2019/0252814 A1* | 8/2019 | Richardson | H05K 5/03 |
| 2020/0104117 A1* | 4/2020 | Ulen | H05K 1/0215 |
| 2020/0183000 A1* | 6/2020 | Li | G01S 13/878 |
| 2020/0221382 A1* | 7/2020 | Konradsson | H04W 88/08 |
| 2020/0250940 A1* | 8/2020 | Davis | H04B 1/401 |
| 2020/0319925 A1* | 10/2020 | Clampitt, III | G06F 11/1441 |
| 2020/0323030 A1* | 10/2020 | Mehta | H04L 63/0807 |
| 2021/0006449 A1* | 1/2021 | Zhibo | H04L 27/2657 |
| 2021/0109743 A1* | 4/2021 | Ulen | G06F 8/66 |

\* cited by examiner

PROGRAMMABLE LONG-RANGE WIRELESS SIGNAL REMOTE CONTROL DEVICE

BACKGROUND OF THE INVENTION

Field of the Invention

The present invention is a programmable long-range wireless signal remote control device, and more particularly, a wireless signal remote control device that carries a wireless signal packet data protocol entity to execute a verification procedure on a wireless signal, or to execute an execution program by a programmable entity to control transmission of the wireless signal or a control signal in a time-series interval manner, and to control transmission of the wireless signal or the control signal by a control transmission interface and a sequence data to perform related actions.

Description of the Prior Art

Generally, in order to facilitate a remote control operation, a user usually sends a control signal to a controlled device (such as a TV or a door lock) by using a remote control device, so that the controlled device can be turned on or activated (for example, turn on the TV, unlock the car, start the engine, open the garage, or open the door lock, etc.).

In order to control a plurality of different controlled devices, a remote control device is usually used to receive the control signal transmitted by the user, and then the content of the control signal is determined to be transmitted to a control component of a controlled device corresponding to the control signal, in order to control the controlled device through the control component to perform related operations according to the control signal.

However, when the remote control device receives the control signal, only one of the one-way or two-way control signals can be received, the authenticity of the wireless signal cannot be easily distinguished, and only either the control signal or the data information can be transmitted, both cannot be transmitted to the controlled device at the same time.

In addition, the remote control device can only transmit the control signal on a one-to-one basis to a single controlled device, and cannot perform transmission control in a one-to-many manner to multiple controlled devices. Therefore, a technique is urgently needed in the art for verifying the wireless signal and simultaneously transmitting the wireless signal to external devices, and for allowing the control signal can be transmitted in a one-to-many time-series interval manner to improve the problems of the current technology.

SUMMARY OF THE INVENTION

In order to solve the problems disclosed above, one object of the present invention is to provide a programmable long-range wireless signal remote control device, which mainly executes an execution program by a programmable entity to control a number of sequences and time of the transmission of each control signal to one or more corresponding controlled devices according to the execution program, in order to efficiently transmit the control signal in a one-to-many time-series interval manner.

In order to solve the problems disclosed above, another object of the present invention is to provide a programmable long-range wireless signal remote control device, which mainly receives a wireless signal by a processor, and then performs a verification procedure on the wireless signal by using a wireless signal packet data protocol entity, so that when the wireless signal packet data protocol entity completes the verification procedure, a control transmission interface receives the wireless signal and transmits the wireless signal to a processing component of a controlled device, and a sequence data control interface receives a data signal in the wireless signal and transmits the data signal externally, thereby achieving information preservation and data identification, the reception and transmission of stable signals, and the provision of the control signal and the data signal to the controlled device.

In order to achieve the above object, the present invention provides a programmable long-range wireless signal remote control device, comprising:

a signal transceiver unit, the signal transceiver unit receiving a wireless signal;

a processor, the processor being connected to the signal transceiver unit, the processor being configured to cause a wireless signal packet data protocol entity to receive the wireless signal; and a programmable entity, the programmable entity being connected on the processor, the programmable entity being internally written with an execution program, the programmable entity generating at least one control signal, and controlling a number of sequences and time of transmitting the control signal externally by the wireless signal packet data protocol entity according to the execution program; and wherein, when the wireless signal packet data protocol entity receives the wireless signal, the wireless signal packet data protocol entity drives the programmable entity to act.

Preferably, the wireless signal packet data protocol entity further performs a verification procedure on the wireless signal, and when the wireless signal packet data protocol entity completes the verification procedure, the wireless signal packet data protocol entity drives the programmable entity to act again.

Preferably, the execution program comprises:

the programmable entity zeroing a timer and a sequence step;

the programmable entity reading a time of a sequence step carried in a memory component for loading into the sequence step;

the programmable entity initiating the timer to begin calculating the time;

when the time of the timer is calculated to the time carried in the sequence step, the programmable entity generating a control signal corresponding to a control signal carried in the sequence step, and controlling the wireless signal packet data protocol entity to transmit the control signal externally; and after the control signal is transmitted externally, the programmable entity performing one of the following steps:

the programmable entity reading a time of a next sequence step carried in the memory component for loading into the sequence step, when the time of the timer being calculated to the time of the next sequence step, the programmable entity generating another control signal corresponding to a control signal carried in the next sequence step, and controlling the wireless signal packet data protocol entity to transmit the another control signal externally; or the programmable entity ending the execution program.

Preferably, the programmable long-range wireless signal remote control device comprises a display unit, and the display unit is connected to the processor.

Preferably, the programmable long-range wireless signal remote control device comprises a power supply body and an electrical quantity monitoring unit, the power supply body providing electric energy to the programmable long-range wireless signal remote control device, the electrical quantity monitoring unit being connected to the power supply body and the processor, the electrical quantity monitoring unit monitors a remaining electrical quantity of the power supply body, and generating an electrical quantity monitoring signal, and the electrical quantity monitoring unit transmitting the electrical quantity monitoring signal to the processor.

Preferably, the programmable long-range wireless signal remote control device comprises a temperature monitoring unit, the temperature monitoring unit monitoring the temperature of the processor and comparing the temperature of the processor with a preset temperature value provided in the temperature monitoring unit.

Preferably, the programmable long-range wireless signal remote control device comprises a memory unit, the memory unit being connected to the processor, the memory unit storing the wireless signal, and the memory unit being an electrically erasable programmable read only memory (EEPROM).

Preferably, the wireless signal packet data protocol entity is provided with at least one output interface, with the output interface being used for transmitting the wireless signal or the control signal externally.

In order to achieve the above objectives, the present invention is a programmable long-range wireless signal remote control device, comprising:

a signal transceiver unit, the signal transceiver unit receiving a wireless signal;

a processor, the processor being connected to the signal transceiver unit, the processor being configured to cause a wireless signal packet data protocol entity to receive the wireless signal, and the wireless signal packet data protocol entity performing a verification procedure on the wireless signal, so that when the wireless signal packet data protocol entity completes the verification procedure, the wireless signal packet data protocol entity transmits the wireless signal externally;

a control transmission interface, the control transmission interface receiving the wireless signal from the wireless signal packet data protocol entity, and transmitting the wireless signal to a processing component of a controlled device;

a sequence data control interface, the sequence data control interface receiving the wireless signal from the wireless signal packet data protocol entity, and transmitting a data signal in the wireless signal externally; and a programmable entity, the programmable entity being connected on the processor, the programmable entity being internally written with an execution program, so that when the wireless signal packet data protocol entity completes the verification procedure, the programmable entity controls a number of sequences and time of transmitting the wireless signal externally by the wireless signal packet data protocol entity according to the execution program.

Preferably, the execution program comprises:

the programmable entity zeroing a timer and a sequence step;

the programmable entity reading a time of a sequence step carried in a memory component for loading into the sequence step;

the programmable entity initiating the timer to begin calculating the time;

when the time of the timer is calculated to the time carried in the sequence step, the programmable entity controlling the wireless signal packet data protocol entity to transmit the wireless signal externally; and the programmable entity ending the execution program.

Preferably, the verification procedure comprises:

the wireless signal packet data protocol entity verifying whether the wireless signal is a one-way wireless signal or a two-way wireless signal; and the wireless signal packet data protocol entity verifying whether the wireless signal is an encrypted wireless signal or an unencrypted wireless signal.

Preferably, the verification procedure further comprises:

the wireless signal packet data protocol entity verifying whether the wireless signal is an erroneous wireless signal, and if the wireless signal packet data protocol entity determines that the wireless signal is an erroneous wireless signal, the wireless signal packet data protocol entity ignores the wireless signal.

Preferably, when the wireless signal packet data protocol entity verifies that the wireless signal is a two-way wireless signal, the processor generates a feedback signal and transmits the feedback signal to the signal transceiver unit, and the signal transceiver unit transmits the feedback signal to a wireless device.

Preferably, the programmable long-range wireless signal remote control device comprises a de-encoding unit, and the de-encoding unit is located on the processor, so that when the wireless signal packet data protocol entity verifies that the wireless signal is an encrypted wireless signal, the de-encoding unit performs a decoding procedure on the wireless signal, or when the processor generates the feedback signal, the de-encoding unit performs an encoding procedure on the feedback signal.

Preferably, the control transmission interface comprises a relay, a transistor, or a pulse width modulation controller.

Preferably, the control signal is a pulse width modulation signal or an electric current signal.

Preferably, the sequence data control interface comprises a serial peripheral interface (SPI), an inter-integrated circuit (I2C), or a universal asynchronous receiver/transmitter (UART).

BRIEF DESCRIPTION OF THE DRAWINGS

The techniques of the present invention will be more understandable from the detailed description given herein below and the accompanying figures which are provided for better illustration, and wherein.

DETAILED DESCRIPTION OF THE PREFERRED EMBODIMENT

Figure 1:
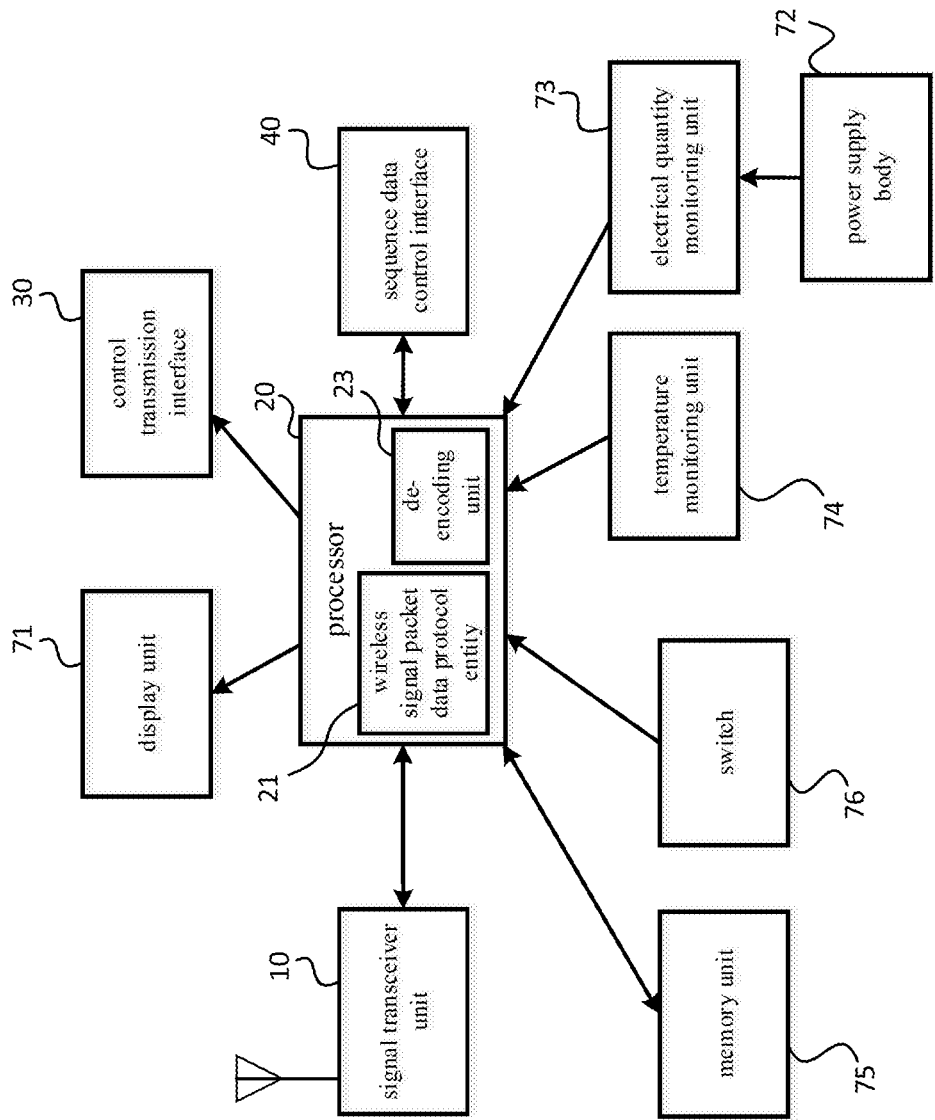
FIG. 1 is a system connection diagram of the present invention.
Figure 2:
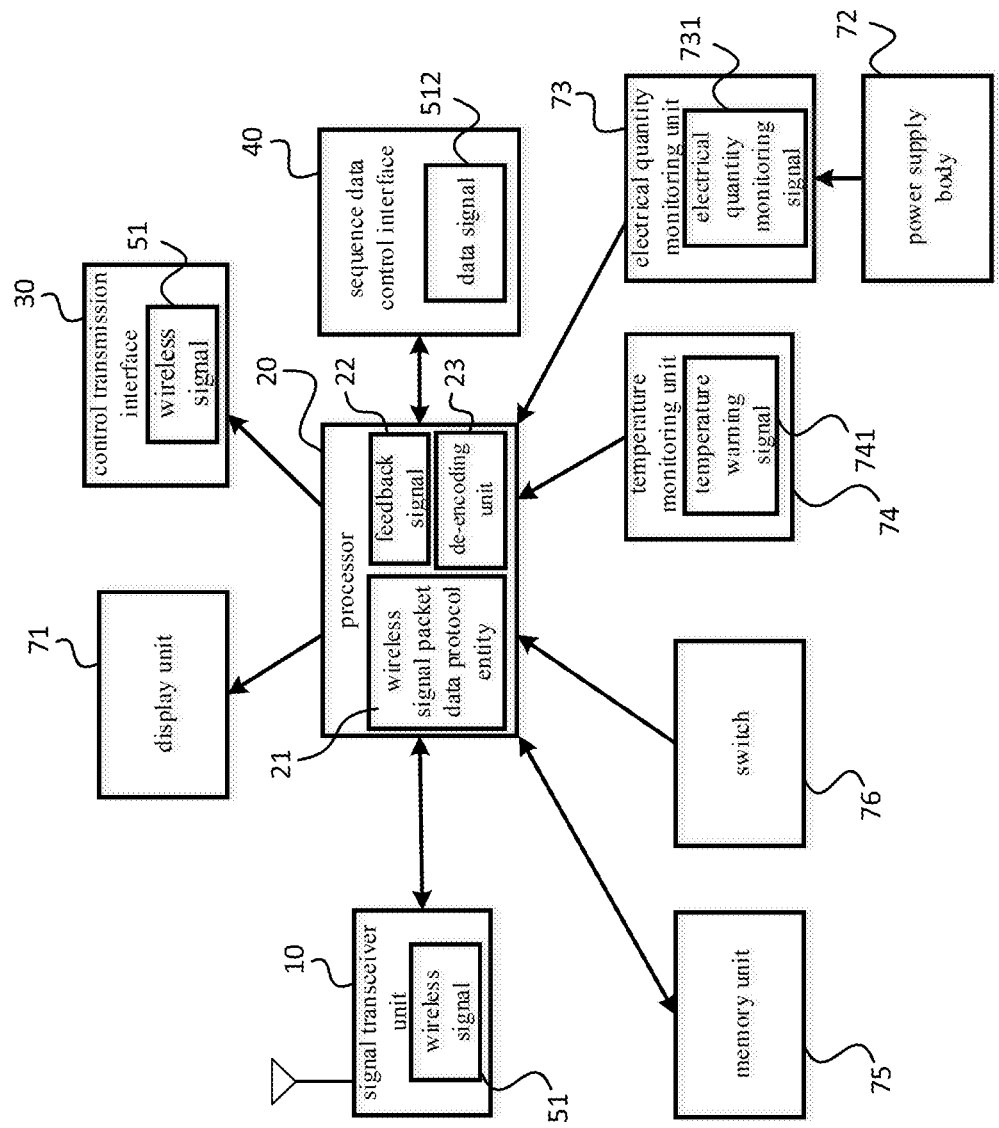
FIG. 2 is a diagram of transmission of information of the present invention.
Figure 3:
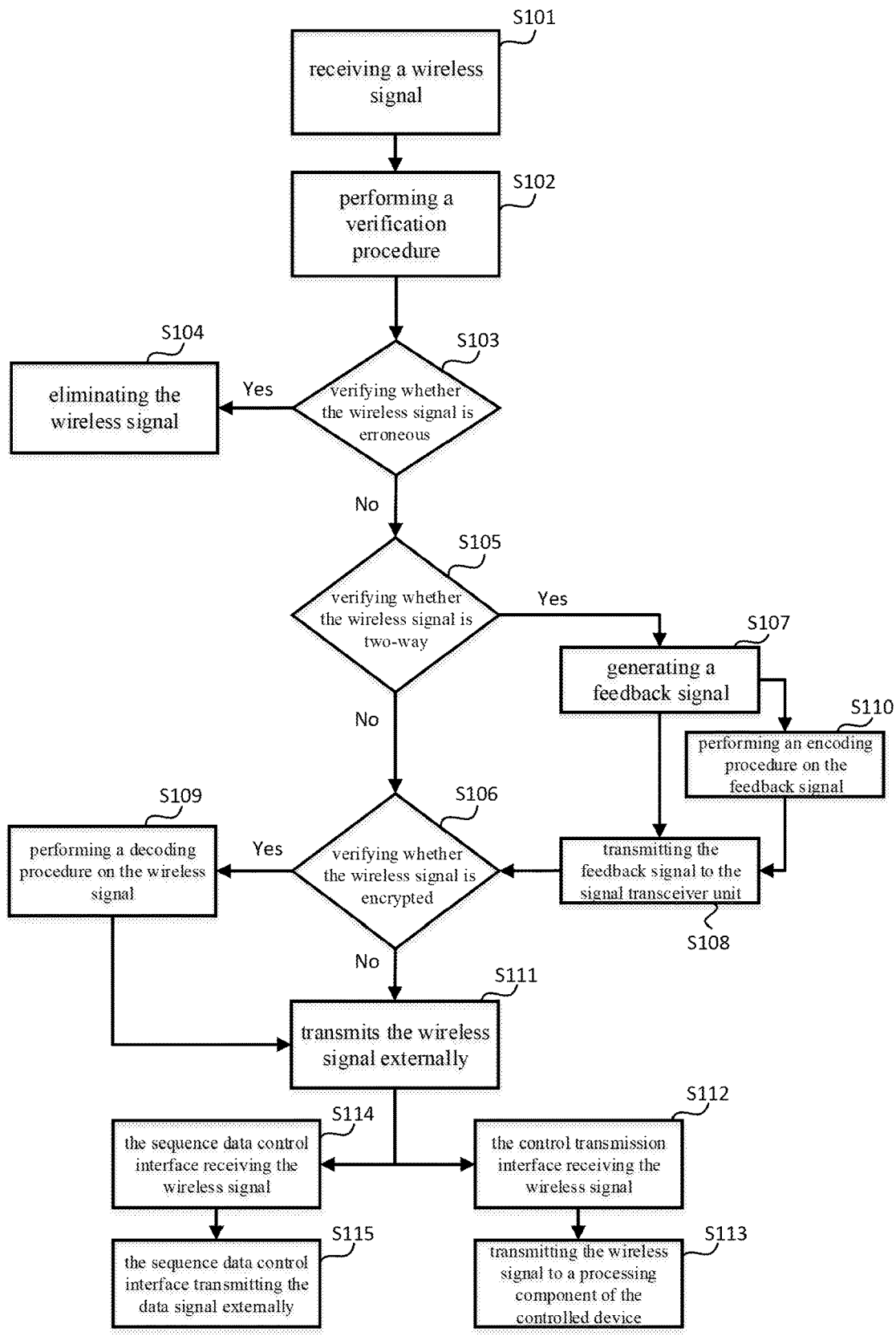
FIG. 3 is a flow chart of steps of the present invention.
Figure 4:
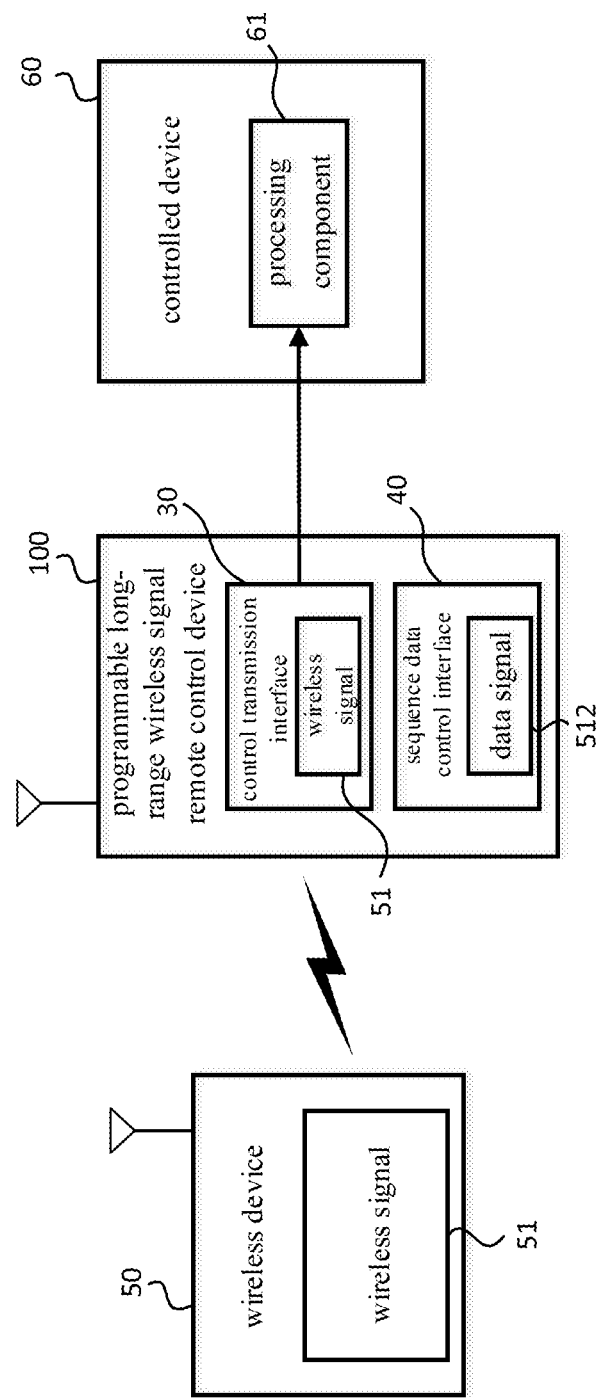
FIG. 4 is a connection diagram between an external device and the present invention.
Figure 5:
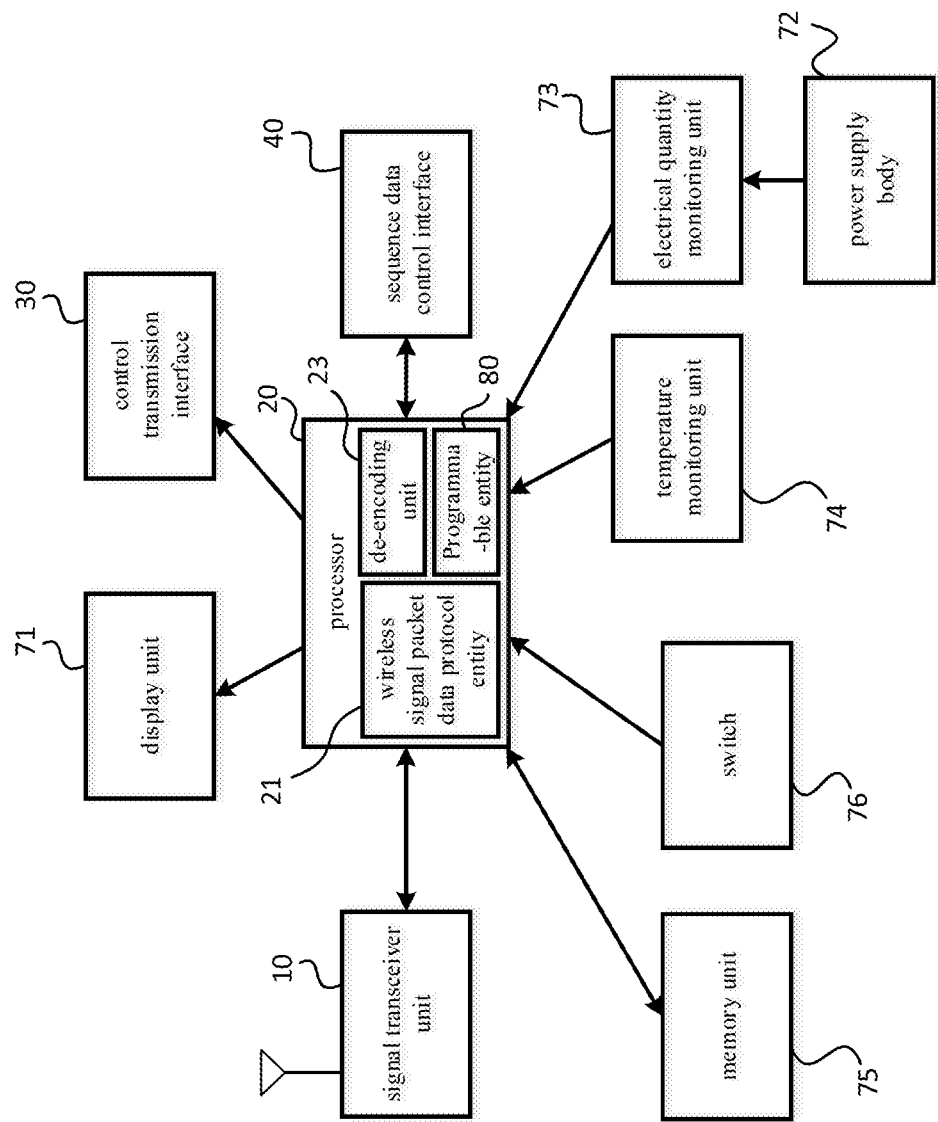
FIG. 5 is a system connection diagram of a programmable entity of the present invention.
Figure 6:
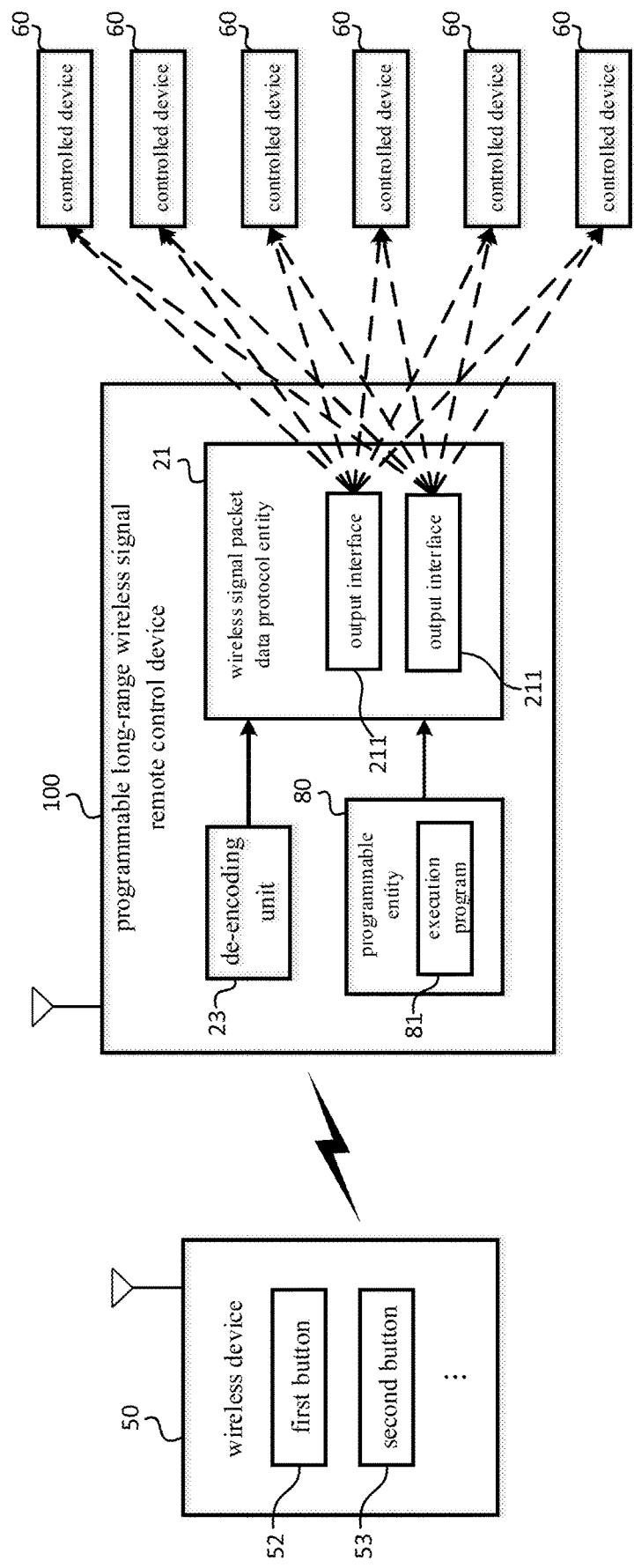
FIG. 6 is a connection diagram between external devices and the programmable entity of the present invention.

In order to clarify the objectives, technical solutions, and advantages of the present invention, the present invention will be further described in detail below with reference to the drawings and embodiments. It should be understood that the specific embodiments described herein are merely illustrative of the present invention, but are not intended to limit the present invention. The following is a further description of the present invention in conjunction with the drawings.

Please refer to FIG. 1 to FIG. 4, which are respectively the system connection diagram, the diagram of transmission of information, the flow chart of steps of the present invention, and the connection diagram between an external device and the present invention. As shown in the figures, a programmable long-range wireless signal remote control device 100 of the present invention is mainly composed of a signal transceiver unit 10, a processor 20, a control transmission interface 30, and a sequence data control interface 40. Wherein the signal transceiver unit 10 is used to receive a wireless signal 51 transmitted from a wireless device 50, or transmit a feedback signal 22 to the wireless device 50. Wherein the wireless device 50 can be a wireless transceiver located in a controlled device 60 or a separate wireless device.

The processor 20 is connected to the signal transceiver unit 10 to receive the wireless signal 51 (S101), wherein the processor 20 is configured to receive the wireless signal 51 by a wireless signal packet data protocol entity 21, and perform a verification procedure on the wireless signal 51 (S102), and the verification procedure comprises: the wireless signal packet data protocol entity 21 verifying whether the wireless signal 51 is an erroneous wireless signal 51 (S103). If the wireless signal packet data protocol entity 21 determines that the wireless signal 51 is an erroneous wireless signal 51, the wireless signal packet data protocol entity 21 ignores the wireless signal 51 (S104); the wireless signal packet data protocol entity 21 verifying whether the wireless signal 51 is a one-way wireless signal 51 or a two-way wireless signal 51 (S105); and the wireless signal packet data protocol entity 21 verifying whether the wireless signal 51 is an encrypted wireless signal 51 or an unencrypted wireless signal 51 (S106).

However, the sequence of the steps of the above verification procedure is not in any specific order, for example, the wireless signal packet data protocol entity 21 can first verify whether the wireless signal 51 is a one-way or a two-way wireless signal 51, and then verify whether the wireless signal 51 is encrypted; or first verify whether the wireless signal 51 is encrypted, and then verify whether the wireless signal 51 is a one-way or a two-way wireless signal 51, etc.

When the wireless signal packet data protocol entity 21 completes the verification procedure, it can determine whether the wireless signal 51 is a one-way or a two-way wireless signal 51, and determine whether the wireless signal 51 is encrypted. If the wireless signal 51 is a two-way wireless signal 51, the processor 20 generates a feedback signal 22 (S107), and transmits the feedback signal 22 to the signal transceiver unit 10 (S108) in order to transmit the feedback signal 22 through the signal transceiver unit 10 to the wireless device 50. Thus, the wireless device 50 obtains feedback data from the feedback signal 22 to confirm whether the processor 20 receives the wireless signal 51.

In addition, the programmable long-range wireless signal remote control device 100 can further comprise a de-encoding unit 23, and the de-encoding unit 23 is located on the processor 20. When the de-encoding unit 23 receives the wireless signal 51, and the wireless signal packet data protocol entity 21 verifies that the wireless signal 51 is an encrypted wireless signal 51, the de-encoding unit 23 performs a decoding procedure on the wireless signal 51 (S109) to decrypt the wireless signal 51. Furthermore, after the processor 20 generates a feedback signal 22, the processor 20 can first perform an encoding procedure on the feedback signal 22 via the de-encoding unit 23 (S110), and then the signal transceiver unit 10 transmits the feedback signal 22 to the wireless device 50 to enhance the security of information transmission.

After the wireless signal packet data protocol entity 21 completes the verification procedure, the wireless signal packet data protocol entity 21 transmits the wireless signal 51 externally (S111).

The wireless signal 51 can include a control signal and a data signal 512. When the wireless signal packet data protocol entity 21 transmits the wireless signal 51 externally, the control transmission interface 30 (for example, a relay, a transistor, or a pulse width modulation controller) receives the wireless signal 51 (S112), and modulates the wireless signal 51 in order to transmit the wireless signal 51 to a processing component 61 of the controlled device 60 (S113). Then the controlled device 60 can decrypt the control signal and the data signal 512 in the wireless signal 51, and drive a control component in the controlled device 60 to operate according to the control signal, and adjust the operation mode of the control component according to the content of the data signal 512. For example, if the purpose of the data signal 512 is to switch a channel to the 64th channel, and the purpose of the control signal is to turn on the television, when the television receives the control signal and the data signal 512, the television is turned on, and the television is switched to the 64th channel; or when the purpose of the data signal 512 is to set the time to 17:50, and the purpose of the control signal is to turn on the air conditioner, when the air conditioner receives the control signal and the data signal 512, the air conditioner is turned on at 17:50. In this way, when the controlled device 60 receives the control signal and the data signal 512 in the wireless signal 51, the controlled device 60 can operate according to the content of the control signal and the data signal 512.

Moreover, when the wireless signal packet data protocol entity 21 transmits the wireless signal 51 externally, the sequence data control interface 40 (for example, a serial peripheral interface (SPI), an inter-integrated circuit (I2C) or a universal asynchronous receiver/transmitter (UART)) also receives the wireless signal 51 (S114), and modulates the wireless signal 51 in order to transmit the data signal 512 in the wireless signal 51 externally (S115) and to receive the data signal 512 through another electronic device, thereby performing data processing or another actions.

Furthermore, the programmable long-range wireless signal remote control device 100 further comprises a display unit 71, a power supply body 72, and an electrical quantity monitoring unit 73, a temperature monitoring unit 74, a memory unit 75, and a switch 76. The display unit 71 is connected to the processor 20 and used to display the processing process of the processor 20, the content of the wireless signal 51 or another signals, etc. The power supply body 72 can provide electric energy to the programmable long-range wireless signal remote control device 100. The electrical quantity monitoring unit 73 is connected to the power supply body 72 and the processor 20, and the electrical quantity monitoring unit 73 monitors a remaining electrical quantity of the power supply body 72, and generates an electrical quantity monitoring signal 731. The electrical quantity monitoring unit 73 transmits the electrical quantity monitoring signal 731 to the processor 20 to display the content of the electrical quantity monitoring signal 731 (e.g. electrical quantity) through the display unit 71.

The temperature monitoring unit 74 monitors a temperature of the processor 20 and compares the temperature of the processor 20 with a preset temperature value provided in the temperature monitoring unit 74. When the temperature of the processor 20 exceeds the preset temperature value, the temperature monitoring unit 74 can determine that the processor 20 is overheated to generate a temperature warning signal 741 for transmitting to the processor 20, and then display the temperature warning signal 741 through the display unit 71. The memory unit 75 is an electronically erasable programmable read only memory (EEPROM) and is connected to the processor 20 for storing the wireless signal 51 or the other signals (for example, the electrical quantity monitoring signal 731). The switch 76 can turn the programmable long-range wireless signal remote control device 100 on or off.

Thus, with the technical content disclosed above, the present invention can effectively achieve the results of information preservation and data identification, the reception and transmission of stable signals, and the provision of the control signal and the data signal 512 to the controlled device.

Please refer to FIG. 4 to FIG. 8, which are respectively the system connection diagram of a programmable entity, the connection diagram between external devices and the programmable entity, the flow chart of steps of executing an execution program by the programmable entity of the present invention, and the diagram of the programmable entity of the present invention controlling a wireless signal packet data protocol entity to transmit a wireless signal externally according to the execution program. As shown in the figures, the processor 20 is configured with a programmable entity 80, and the programmable entity 80 is internally written with an execution program 81, so that when the wireless signal packet data protocol entity 21 completes the verification procedure, the programmable entity 80 can control a number of sequences and time of transmitting the wireless signal 51 externally by the wireless signal packet data protocol entity 21 according to the execution program 81, or control a number of sequences and time of transmitting each of the control signals externally by the wireless signal packet data protocol entity 21. Thus, if the programmable entity 80 controls the wireless signal packet data protocol entity 21 to transmit each of the control signals externally, the wireless signal 51 can be a trigger signal (e.g. trigger by the control signal in the wireless signal 51). When the wireless signal packet data protocol entity 21 determines that the wireless signal 51 is authentic via the verification procedure, the programmable entity 80 can be activated to execute the execution program 81, thereby driving the wireless signal packet data protocol entity 21 to transmit each of the control signals externally, and the data signal 512 in the wireless signal 51 can also be transmitted externally through the sequence data control interface 40.

For example, the wireless device 50 can be provided with a first button 52, a second button 53, or two or more buttons, the number of which is not limited. Through triggering, for example, the first button 52, the second button 53 or another button, the wireless signal 51 is sent to the programmable long-range wireless signal remote control device 100. For example, when a user triggers the first button 52, the programmable long-range wireless signal remote control device 100 receives the wireless signal to perform the decoding procedure on the wireless signal 51 through the de-encoding unit 23, and then the programmable entity 80 executes the execution program 81 to control the wireless signal packet data protocol entity 21 to sequentially transmit each of the control signals externally by a first output interface 211. Thus, the control action of the execution program 81 can be, for example, sending the second control signal 120 seconds after the first control signal is sent, and then sending the third control signal after another 60 seconds.

At this time, when the programmable entity 80 controls the wireless signal packet data protocol entity 21 according to the execution program 81, the programmable long-range wireless could be programmed to signal remote control device 100 to control the controlled devices 60 within a period of time (for example, 10 seconds to 30 seconds).

However, for example, if the user triggers the second button 53, the programmable long-range wireless signal remote control device 100 also receives the another wireless signal 51, which is different from the above in that the programmable entity 80 performs a different execution program 81 to control the wireless signal packet data protocol entity 21 to sequentially transmit each of the control signals externally by the second output interface 211 for transmitting to one or more controlled devices 60.

Therefore, when the execution program 81 is executed (S201), the programmable entity 80 first zeros (S202) a timer and a sequence step in the programmable entity 80 (S202). The timer is used to calculate the time, and the sequence step is used to record a specific transmission time of each signal. Thus, after the programmable entity 80 zeros the timer and the sequence step, the programmable entity 80 reads a time of a sequence step (e.g. 0 second) carried in a memory component (e.g. the memory component located in the programmable entity 80) for loading into the sequence step of the programmable entity 80 (S203), and starting the timer to calculate time from zero (S204). When the time of the timer is calculated to the time carried in the sequence step, the programmable entity 80 generates a control signal corresponding to a control signal carried in the sequence step, and controls the wireless signal packet data protocol entity 21 to transmit the control signal carried in the sequence step externally (S205), in order to receive the control signal through the control transmission interface 30, and execute a subsequent procedure (e.g. through the control transmission interface 30 transmitting the control signal to one or more of the controlled devices 60 such that the controlled device(s) 60 operates according to the control signal). But if the timer has not yet calculated to the time carried in the sequence step (assuming that the time-sequence is 60 seconds, the programmable entity 80 will only perform subsequent operations until the timer calculates to 60 seconds), the timer continues to increase the time calculation (S206).

Figure 7:
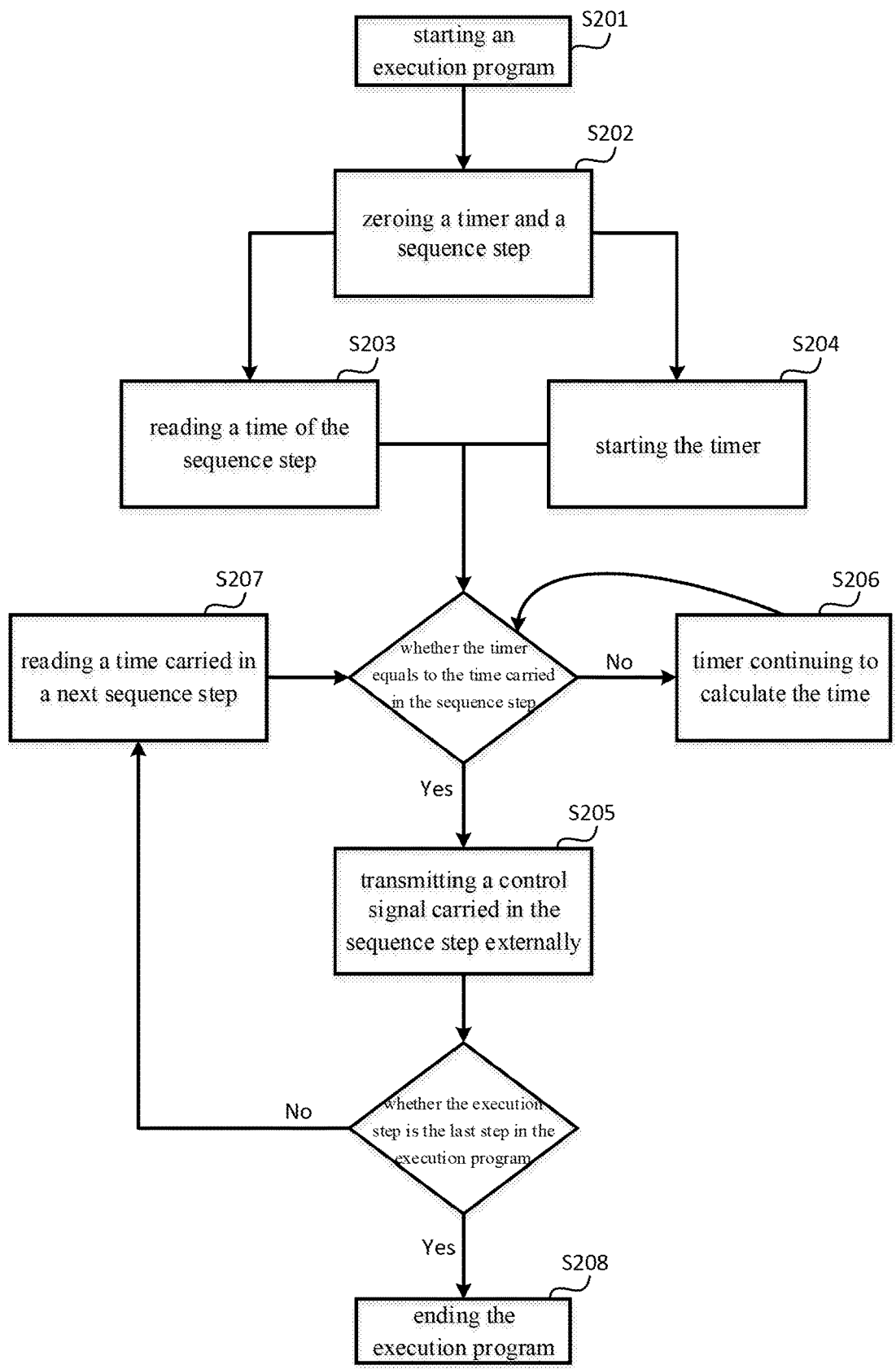
FIG. 7 is a flow chart of steps of executing an execution program by the programmable entity of the present invention.

After the control signal is transmitted externally, the programmable entity 80 continues to execute the execution program 81. If the execution step written in the execution program 81 is reading a time of a next sequence step of the memory component, the programmable entity 80 then reads the time carried in the next sequence step of the memory component (S207) for loading into the sequence step of the programmable entity 80. Until the time of the timer is calculated to the time of the next sequence step, the programmable entity 80 generates another control signal corresponding to a control signal carried in the next sequence step, and controls the wireless signal packet data protocol entity 21 to transmit another control signal externally (S205). At this time, the time calculation of the timer is not stopped because the first control signal is transmitted externally, so assuming that the time of the sequence step of the second control signal is 120 seconds, in fact, the timer is 60 seconds (60+60=120 seconds) after the first control signal is transmitted externally (assuming that the first control signal is transmitted after 60 seconds), and the programmable entity 80 controls the wireless signal packet data protocol entity 21 to transmit the second control signal externally. But if the execution step in the execution program 81 is the last execution step, the programmable entity 80 ends the execution program 81 (S208) (as shown in FIG. 7).

Figure 8:
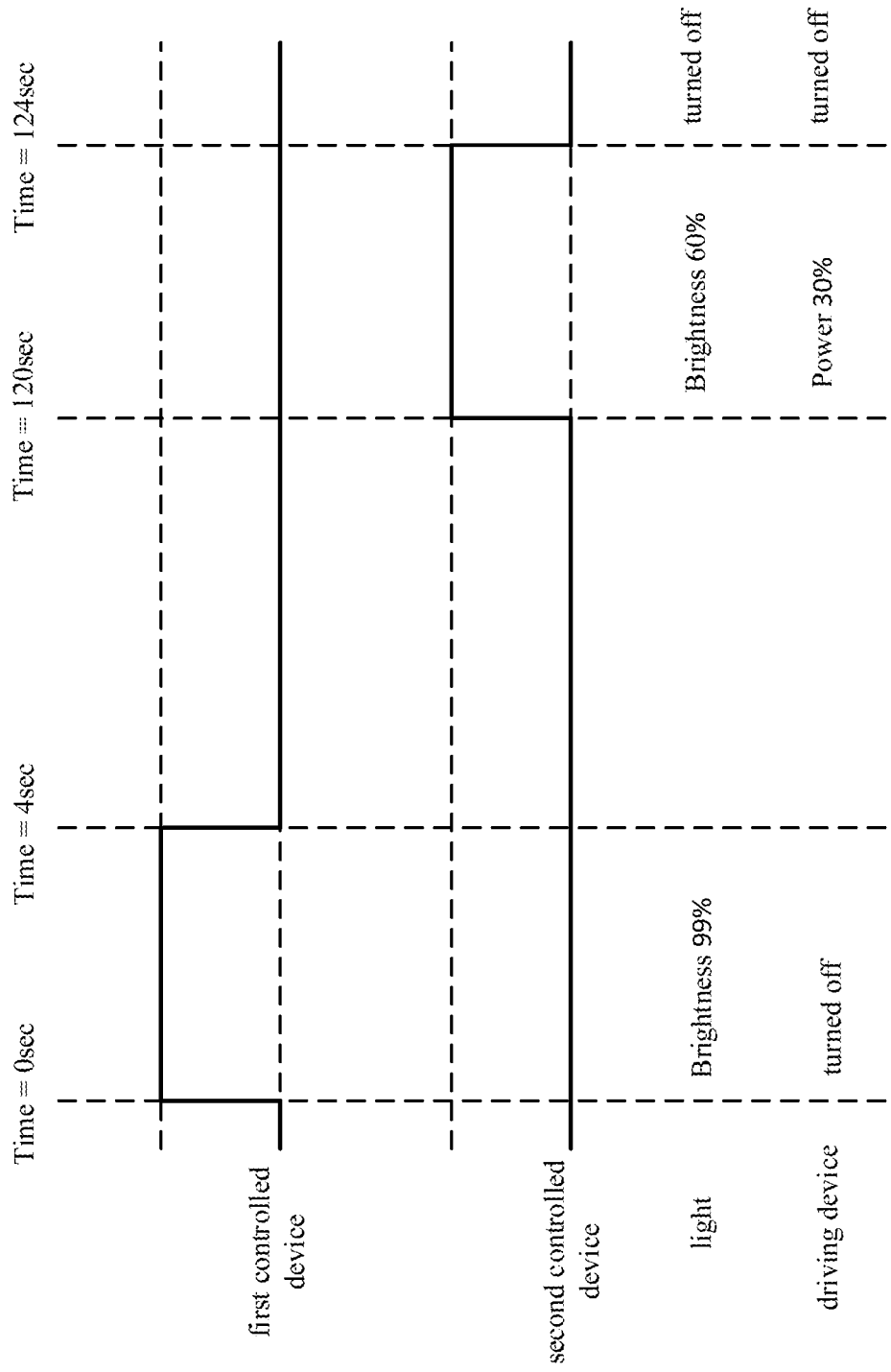
FIG. 8 is a time-sequential diagram of the programmable entity of the present invention controlling a wireless signal packet data protocol entity to transmit a wireless signal externally according to the execution program.

In one example, assuming that the control signal is a pulse width modulation signal, when the first control signal is transmitted externally to cause the first controlled device 60 to receive the control signal of the first control signal (for example, at 0 seconds), a light of the controlled device 60 can be set to emit light with a brightness of 99%, and a driving device connected to the first controlled device 60 will not start, and at 4 seconds, the brightness of the light of the controlled device 60 will continue to be maintained. After 120 seconds, after the second controlled device 60 receives the control signal of the second control signal, the light of the second controlled device 60 will emit light with a brightness of 60%, and a driving device connected to the second controlled device 60 drives with 30% power, and the light and the driving device of the second controlled device 60 are turned off at 124 seconds (as shown in FIG. 8), therefore allowing the transmitting of the control signal in a one-to-many time-series interval manner.

However, if only the wireless signal is transmitted, the programmable entity 80 can directly end the execution program 81 after the programmable entity 80 controls the wireless signal packet data protocol entity 21 to transmit the wireless signal externally.

The above detailed description is intended to be a specific illustration of the embodiments of the present invention, and the embodiments are not used to limit the scope of the present invention. Any equivalent implementations or modifications that are not departing from the spirit of the present invention should be included in the claims of the present invention. Moreover, the present invention is not only innovative in terms of technical thinking, but also has many of the above-mentioned capabilities that are not in the prior art, and has fully complied with the statutory patent requirements of novelty and non-obviousness. This application is submitted in accordance with the laws, and the Office is earnestly requested to grant the application for this utility patent to encourage invention.

What is claimed is:

1. A programmable wireless signal remote control device for controlling a smart device, comprising:
   a signal transceiver unit, the signal transceiver unit receiving a wireless signal;
   a wireless signal packet data protocol entity receiving the wireless signal from the signal transceiver unit; and
   a processor, connected to the signal transceiver unit, the processor configured to cause the wireless signal packet data protocol entity to receive the wireless signal, wherein the processor includes a programmable entity internally written with an execution program, the programmable entity generates at least one control signal, and controls a number of sequences and time of transmission of the at least one control signal externally by the wireless signal packet data protocol entity according to the execution program;
   wherein the wireless signal packet data protocol entity drives the programmable entity to act;
   wherein the execution program performs the steps of:
      zeroing a timer and a sequence step by the programmable entity;
      reading a time stored in a memory component by the programmable entity for loading into the sequence step;
      initiating the timer by the programmable entity to begin calculating time from zero;
      when the time of the timer is calculated to the time loaded in the sequence step, the programmable entity generates an external control signal corresponding to a control signal stored in the sequence step, and controls the wireless signal packet data protocol entity to transmit the external control signal externally;
   wherein the programmable entity performs one of the following steps when the control signal is transmitted externally:
      reading a time value for a next sequence step stored in the memory component by the programmable entity for loading into the sequence step, and when the time of the timer is calculated to the time of the next sequence step, the programmable entity generates another external control signal corresponding to another control signal stored in the next sequence step, and controls the wireless signal packet data protocol entity to transmit the another external control signal externally; or
      ending the execution program by the programmable entity.

2. The programmable wireless signal remote control device as claimed in claim 1, wherein the wireless signal packet data protocol entity further performs a verification procedure on the wireless signal, and when the wireless signal packet data protocol entity completes the verification procedure, the wireless signal packet data protocol entity drives the programmable entity to act again.

3. The programmable wireless signal remote control device as claimed in claim 1, comprising a display unit, and the display unit being connected to the processor.

4. The programmable wireless signal remote control device as claimed in claim 1, comprising a power supply body and an electrical quantity monitoring unit, the power supply body providing electric energy to the programmable wireless signal remote control device, the electrical quantity monitoring unit being connected to the power supply body and the processor, the electrical quantity monitoring unit monitoring the remaining electrical quantity of the power supply body, and generating an electrical quantity monitoring signal, and the electrical quantity monitoring unit transmitting the electrical quantity monitoring signal to the processor.

5. The programmable wireless signal remote control device as claimed in claim 1, comprising a temperature monitoring unit, the temperature monitoring unit monitoring the temperature of the processor, and comparing the temperature of the processor to a preset temperature value provided in the temperature monitoring unit.

6. The programmable wireless signal remote control device as claimed in claim 1, comprising a memory unit, the memory unit being connected to the processor, the memory unit storing the wireless signal, and the memory unit being an electrically erasable programmable read only memory (EEPROM).

7. The programmable wireless signal remote control device as claimed in claim 1, wherein on the wireless signal packet data protocol entity is provided with at least one output interface, and the output interface is used for transmitting the control signal externally.

8. A programmable wireless signal remote control device for transmitting wireless signals to a smart device, comprising:
   a signal transceiver unit, the signal transceiver unit receiving a wireless signal;
   a wireless signal packet data protocol entity receiving the wireless signal from the signal transceiver unit;
   a processor, the processor being connected to the signal transceiver unit, the processor being configured to cause the wireless signal packet data protocol entity to receive the wireless signal, and the wireless signal packet data protocol entity performing a verification procedure on the wireless signal, so that when the wireless signal packet data protocol entity completes the verification procedure, the wireless signal packet data protocol entity transmits the wireless signal externally;
   a control transmission interface, the control transmission interface receiving the wireless signal from the wireless signal packet data protocol entity, and then transmitting the wireless signal to a processing component of the smart device;
   a sequence data control interface, the sequence data control interface receiving the wireless signal from the wireless signal packet data protocol entity, and then transmitting the data signal in the wireless signal externally; and
   a programmable entity, the programmable entity being connected to the processor, the programmable entity being internally written with an execution program, so that when the wireless signal packet data protocol entity completes the verification procedure, the programmable entity controlling a number of sequences and the time of transmitting of the wireless signal externally by the wireless signal packet data protocol entity according to the execution program;
   wherein the execution program comprises:
      zeroing a timer and a sequence step by the programmable entity;
      reading a time stored in a memory component by the programmable entity for loading into the sequence step;
      initiating the timer by the programmable entity to begin calculating the time;
      so that when the time of the timer is calculated to the time stored in the sequence step, the programmable entity controlling the wireless signal packet data protocol entity transmits the wireless signal externally; and
      ending the execution program by the programmable entity.

9. The programmable wireless signal remote control device as claimed in claim 8, wherein the verification procedure comprises:
   the wireless signal packet data protocol entity verifying whether the wireless signal is a one-way wireless signal or a two-way wireless signal; and
   the wireless signal packet data protocol entity verifying whether the wireless signal is an encrypted wireless signal or an unencrypted wireless signal.

10. The programmable wireless signal remote control device as claimed in claim 9, wherein the verification procedure further comprises:
    the wireless signal packet data protocol entity verifying whether the wireless signal is an erroneous wireless signal, and if the wireless signal packet data protocol entity determines that the wireless signal is an erroneous wireless signal, the wireless signal packet data protocol entity ignores the wireless signal.

11. The programmable wireless signal remote control device as claimed in claim 9, wherein, when the wireless signal packet data protocol entity verifies that the wireless signal is a two-way wireless signal, the processor generates a feedback signal and transmits the feedback signal to the signal transceiver unit, and the signal transceiver unit transmits the feedback signal to a wireless device.

12. The programmable wireless signal remote control device as claimed in claim 11, comprising a de-encoding unit, and the de-encoding unit being located on the processor, when the wireless signal packet data protocol entity verifies that the wireless signal is the encrypted wireless signal, the de-encoding unit performs a decoding procedure on the wireless signal, or when the processor generates the feedback signal, the de-encoding unit performs an encoding procedure on the feedback signal.

13. The programmable wireless signal remote control device as claimed in claim 8, wherein the control transmission interface comprises a relay, a transistor, or a pulse width modulation controller.

14. The programmable wireless signal remote control device as claimed in claim 8, wherein the control signal is a pulse width modulation signal or an electric current signal.

15. The programmable wireless signal remote control device as claimed in claim 8, wherein the sequence data control interface comprises a serial peripheral interface (SPI), an inter-integrated circuit (I2C), or a universal asynchronous receiver/transmitter (UART).

16. A programmable wireless signal remote control device for controlling a smart device, comprising:
    a signal transceiver unit for receiving a wireless signal, wherein the wireless signal includes at least one control signal and at least one corresponding data signal, and the at least one corresponding data signal specifies a time for transmitting a corresponding at least one external control signal;
    a wireless signal packet data protocol entity for receiving the wireless signal from the signal transceiver unit; and
    a processor for controlling the wireless signal packet data protocol entity to receive and process the wireless signal;
    wherein the processor zeros and starts a timer for tracking the time specified in the at least one corresponding data signal; and
    wherein at the time specified in the at least one corresponding data signal, the processor generates the corresponding at least one external control signal and causes the signal transceiver to transmit the at least one external control signal.

17. The programmable wireless signal remote control device as claimed in claim 1, wherein the wireless signal includes a control signal and a data signal, the data signal specifying the time of transmission of the at least one control signal externally by the wireless signal packet data protocol entity.

18. The programmable wireless signal remote control device as claimed in claim 8, wherein the wireless signal includes a control signal and a data signal, the data signal specifying the time of transmission of the at least one control signal externally by the wireless signal packet data protocol entity.

* * * * *